United States Patent
Serizawa

(10) Patent No.: US 8,873,939 B2
(45) Date of Patent: Oct. 28, 2014

(54) ELECTRONIC APPARATUS, CONTROL METHOD OF ELECTRONIC APPARATUS, AND COMPUTER-READABLE STORAGE MEDIUM

(75) Inventor: Masayasu Serizawa, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 6 days.

(21) Appl. No.: 13/415,551

(22) Filed: Mar. 8, 2012

(65) Prior Publication Data

US 2012/0294593 A1 Nov. 22, 2012

(30) Foreign Application Priority Data

May 16, 2011 (JP) ................................. 2011-109910

(51) Int. Cl.
- *H04N 5/783* (2006.01)
- *H04N 13/00* (2006.01)
- *H04N 21/44* (2011.01)
- *H04N 21/472* (2011.01)
- *G06T 7/00* (2006.01)
- *H04N 13/02* (2006.01)

(52) U.S. Cl.
CPC ........ *H04N 5/783* (2013.01); *G11B 2220/2541* (2013.01); *H04N 13/0029* (2013.01); *H04N 13/0022* (2013.01); *H04N 21/44* (2013.01); *H04N 21/47217* (2013.01); *G06T 7/0051* (2013.01); *H04N 13/0264* (2013.01)
USPC .............. 386/343; 386/223; 386/344; 348/42

(58) Field of Classification Search
CPC .......... H04N 13/0048; H04N 13/0066; H04N 13/0022; H04N 13/0029; H04N 13/0264; H04N 21/44; H04N 5/783; H04N 9/8042; H04N 21/47217; G11B 2220/2541; G06T 7/0051
USPC ............................. 348/42–60, 223, 343–344
See application file for complete search history.

(56) References Cited

U.S. PATENT DOCUMENTS

| | | | | |
|---|---|---|---|---|
| 8,335,425 | B2 * | 12/2012 | Yamashita et al. | 386/248 |
| 2001/0045979 | A1 * | 11/2001 | Matsumoto et al. | 348/43 |
| 2010/0150523 | A1 * | 6/2010 | Okubo et al. | 386/68 |
| 2011/0280552 | A1 * | 11/2011 | Ikeuchi et al. | 386/343 |
| 2011/0286720 | A1 * | 11/2011 | Obana et al. | 386/343 |
| 2012/0019625 | A1 * | 1/2012 | Mishima et al. | 348/49 |
| 2012/0274747 | A1 * | 11/2012 | Yasuda | 348/51 |

FOREIGN PATENT DOCUMENTS

| | | |
|---|---|---|
| JP | 2001-359119 | 12/2001 |
| JP | 2006-186510 | 7/2006 |

* cited by examiner

*Primary Examiner* — Gelek W Topgyal
(74) *Attorney, Agent, or Firm* — Blakely, Sokoloff, Taylor & Zafman LLP

(57) ABSTRACT

An electronic apparatus includes a playback speed information acquiring module and a video signal output module. The playback speed information acquiring module is configured to acquire information relating to a playback speed of video. The video signal output module is configured to perform 3D depth estimation processing on the video according to the acquired information relating to the playback speed of the video and to output a video signal that is subjected to the 3D depth estimation processing.

13 Claims, 7 Drawing Sheets

FIG. 4

| PLAYBACK SPEED | PROCESSING LEVEL | SUBJECT PICTURES | NUMBER OF PROCESSING TECHNIQUES | 3D DEPTH ESTIMATION PROCESSING TECHNIQUES |
|---|---|---|---|---|
| SLOW PLAYBACK (0.5×) | 1 (DETAILED) | ALL OR ALMOST ALL PICTURES | 3 | RECOGNITION OF COMPOSITION, FACE DETECTION, AND MOTION DETECTION OF ALL OR ALMOST ALL PICTURES |
| NORMAL PLAYBACK (1.0×) | 2 (NORMAL) | APPROXIMATELY HALF OF THE PICTURES | 3 | RECOGNITION, FACE DETECTION, AND MOTION DETECTION OF COMPOSITION OF APPROXIMATELY HALF OF THE PICTURES |
| FIRST MODE OF FAST PLAYBACK (FAST VIEWING AND LISTENING) (1.5×) | 3 (SIMPLIFIED) | REDUCED IMAGES OF APPROXIMATELY HALF OF THE PICTURES | 2 | RECOGNITION AND MOTION DETECTION OF COMPOSITION FROM REDUCED IMAGES OF APPROXIMATELY HALF OF THE PICTURES |
| SECOND MODE OF FAST PLAYBACK (2.0×) | 4 (FURTHER SIMPLIFIED) | REDUCED IMAGES OF I PICTURES | 1 | RECOGNITION OF COMPOSITION FROM REDUCED IMAGES OF I PICTURES |

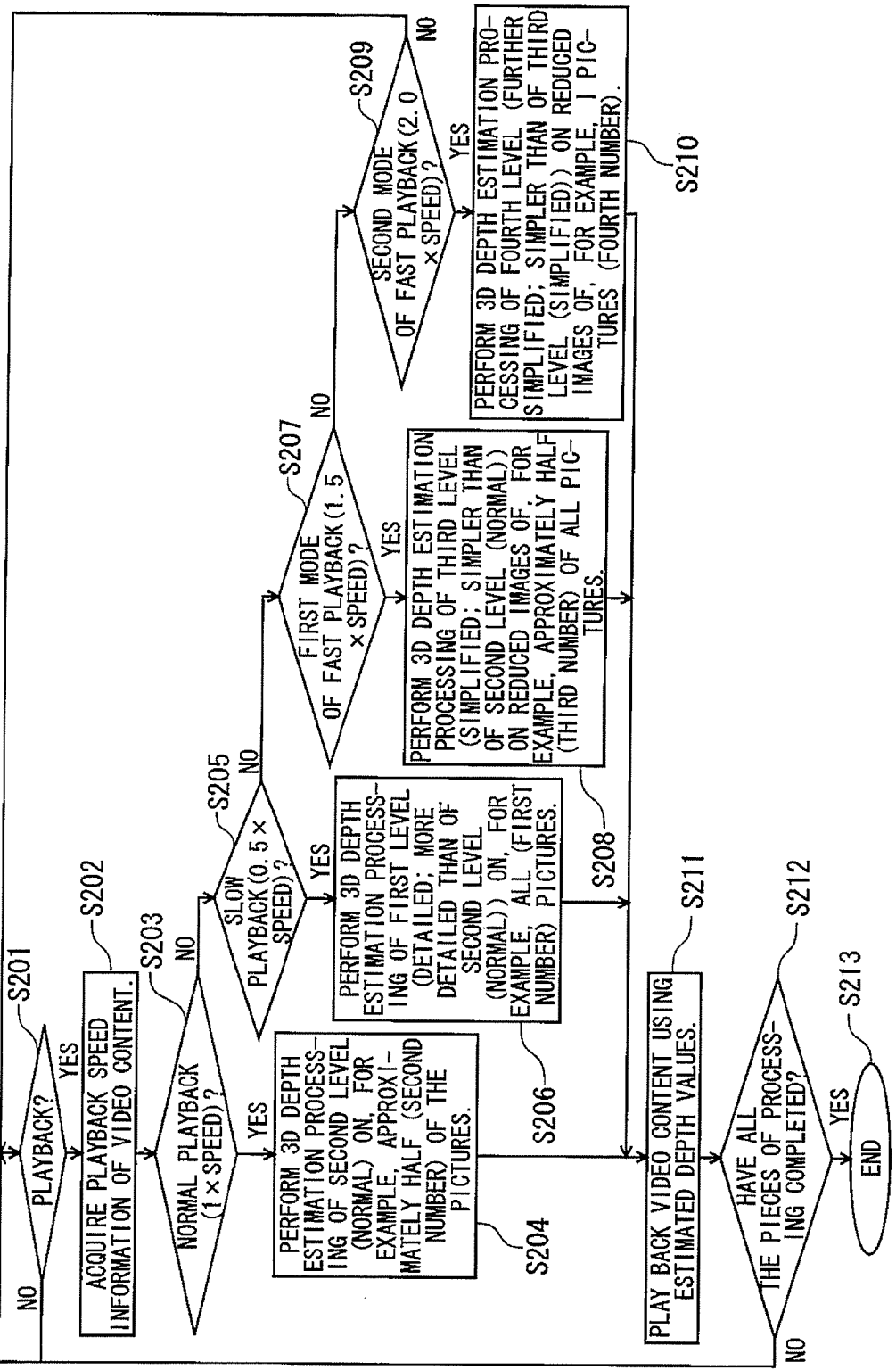

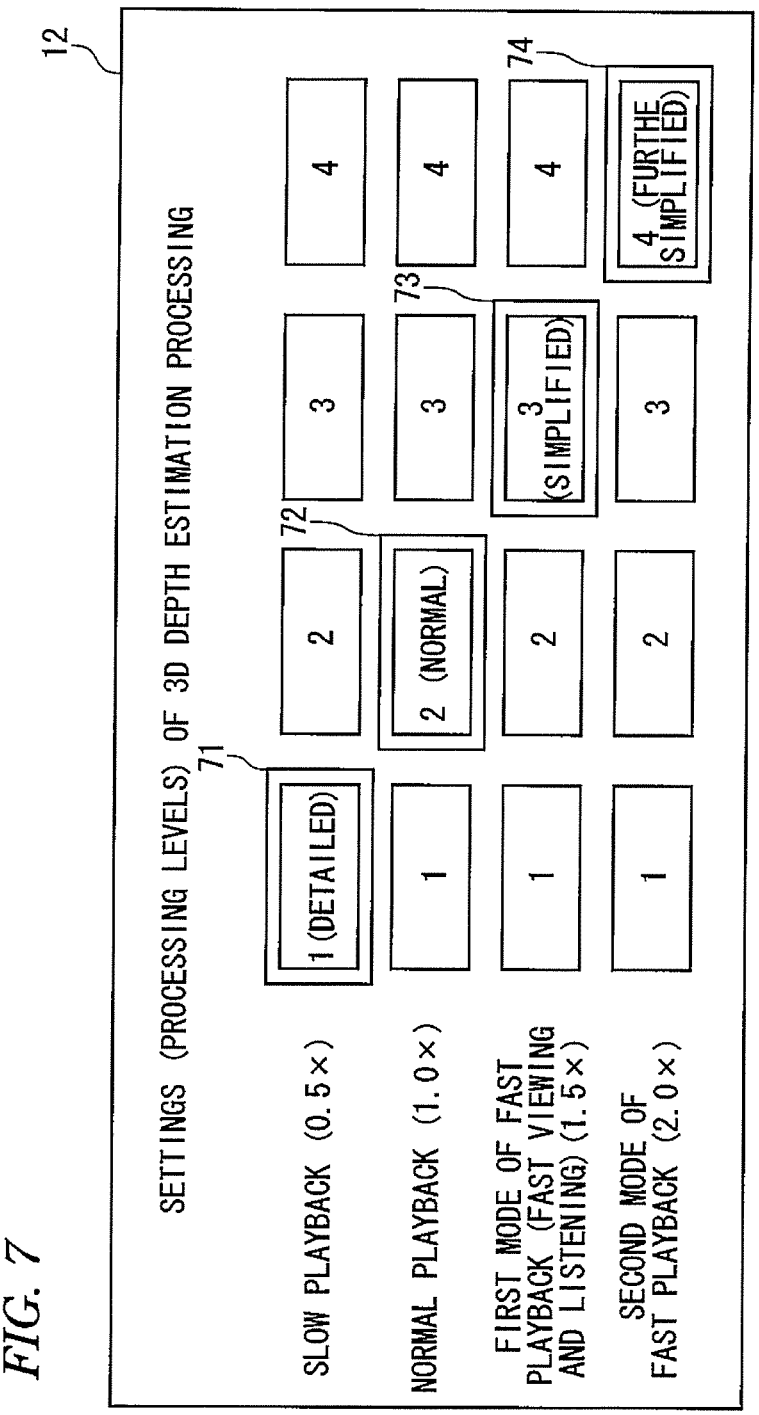

ELECTRONIC APPARATUS, CONTROL METHOD OF ELECTRONIC APPARATUS, AND COMPUTER-READABLE STORAGE MEDIUM

CROSS REFERENCE TO RELATED APPLICATION(S)

The present disclosure relates to the subject matters contained in Japanese Patent Application No. 2011-109910 filed on May 16, 2011, which are incorporated herein by reference in its entirety.

FIELD

An exemplary embodiment of the present invention relates to an electronic apparatus, a control method of an electronic apparatus, and a computer-readable storage medium.

BACKGROUND

In recent years, 3D video output apparatus (electronic apparatus) have been spreading. The term "3D" is an abbreviation of three-dimensional or three dimensions and is used for referring to stereoscopic video or the like.

In recent years, video output apparatus (electronic apparatus) capable of converting 2D video into 3D video (2D-3D converting function) and reproducing the 3D video have also been spreading. Thus 2D-3D converted video can also be reproduced as 3D video.

The term "2D" is an abbreviation of two-dimensional or two dimensions.

In the above 2D-3D conversion processing, for example, 3D depth estimation processing is performed which estimates depth of 3D video by applying plural techniques to 2D video.

Among such video output apparatus (electronic apparatus) are ones having a function of changing the playback speed of video (content) as appropriate according to, for example, a user manipulation in addition to an ordinary reproducing function of reproducing video at a normal playback speed (e.g., 1× playback speed).

These video output apparatus (electronic apparatus) are capable of fast playback and slow playback of video (a content).

However, for example, when the user plays back a 3D video content at a relatively slow speed (slow playback) because he or she wants to view a certain scene of it carefully, the user may find that 3D reproduction video is poor in appearance (e.g., image quality).

BRIEF DESCRIPTION OF THE DRAWINGS

A general configuration that implements the various features of the invention will be described with reference to the drawings. The drawings and the associated descriptions are provided to illustrate embodiments of the invention and should not limit the scope of the invention.

FIG. 4 shows example methods of 3D depth estimation processing that are set in the notebook PC according to the embodiment so as to correspond to respective playback speeds.

FIG. 6 is a flowchart of a detailed process which is performed by the notebook PC according to the embodiment.

FIG. 7 shows an example setting screen which allows the user to set or change 3D depth estimation processing methods corresponding to respective playback speeds in the notebook PC according to the embodiment.

DETAILED DESCRIPTION OF THE EMBODIMENTS

According to one embodiment, there is provided an electronic apparatus including a playback speed information acquiring module and a video signal output module. The playback speed information acquiring module is configured to acquire information relating to a playback speed of video. The video signal output module is configured to perform 3D depth estimation processing on the video according to the acquired information relating to the playback speed of the video and to output a video signal that is subjected to the 3D depth estimation processing.

An exemplary embodiment will be hereinafter described with reference to the drawings.

Figure 1:
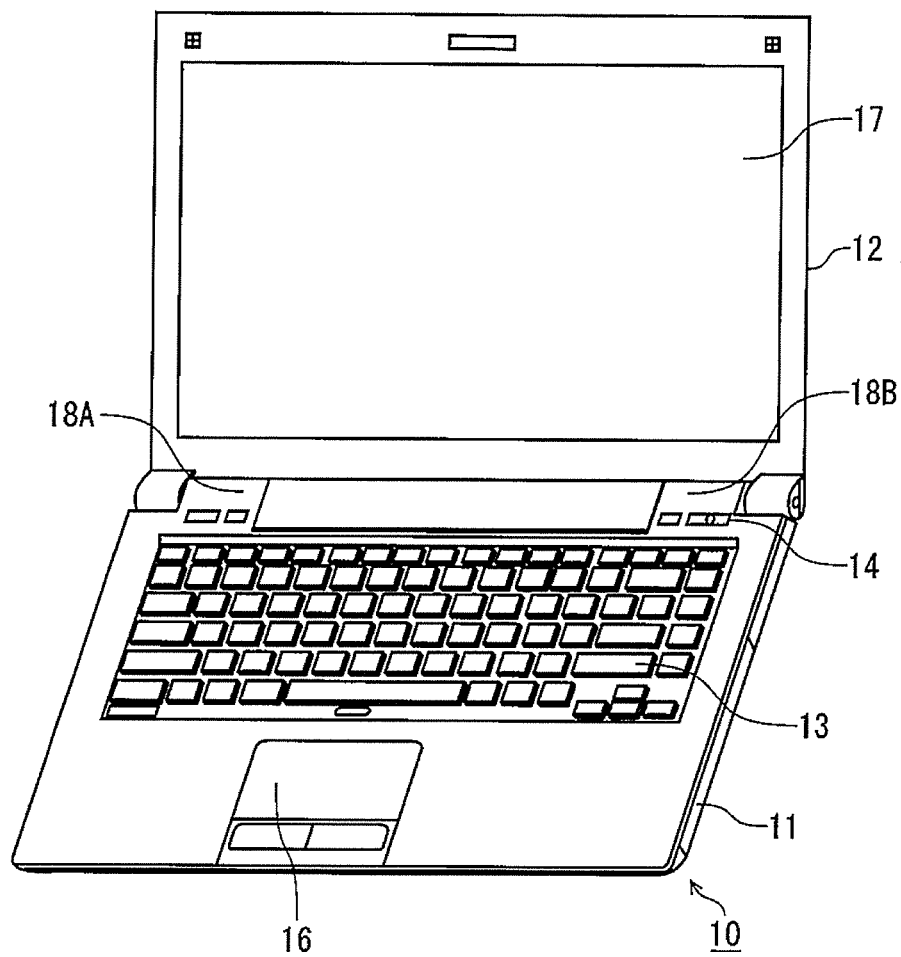
FIG. 1 shows an appearance of a notebook PC according to an exemplary embodiment.

FIG. 1 shows an appearance of a notebook personal computer (PC) 10 according to the embodiment which is an electronic apparatus. However, the application field of the invention is not limited to personal computers and is applicable to TV receivers, cell phones, portable electronic apparatus, etc.

As shown in FIG. 1, the notebook PC 10 is composed of a computer main body 11 and a video display unit 12. The display unit 12 incorporates an LCD (liquid crystal display) 17, for example.

The video display unit 12 is attached to the computer main body 11 so as to be rotatable between an open position where it exposes the top surface of the computer main body 11 and a closed position where it covers the top surface of the computer main body 11.

The computer main body 11 has a thin, box-shaped cabinet, and its top surface is provided with a keyboard 13, a power button 14 for powering on and off the notebook PC 10, a touch pad 16, speakers 18A and 18B, etc.

The right-hand side surface, for example, of the computer main body 11 is provided with a USB connector (not shown) to which a USB cable or a USB device that complies with the USB (universal serial bus) 2.0 standard is to be connected.

The back surface of the computer main body 11 is provided with an external display connection terminal (not shown) that complies with the HDMI (high-definition multimedia interface) standard, for example. The external display connection terminal is used for outputting a digital video signal to an external display.

Figure 2:
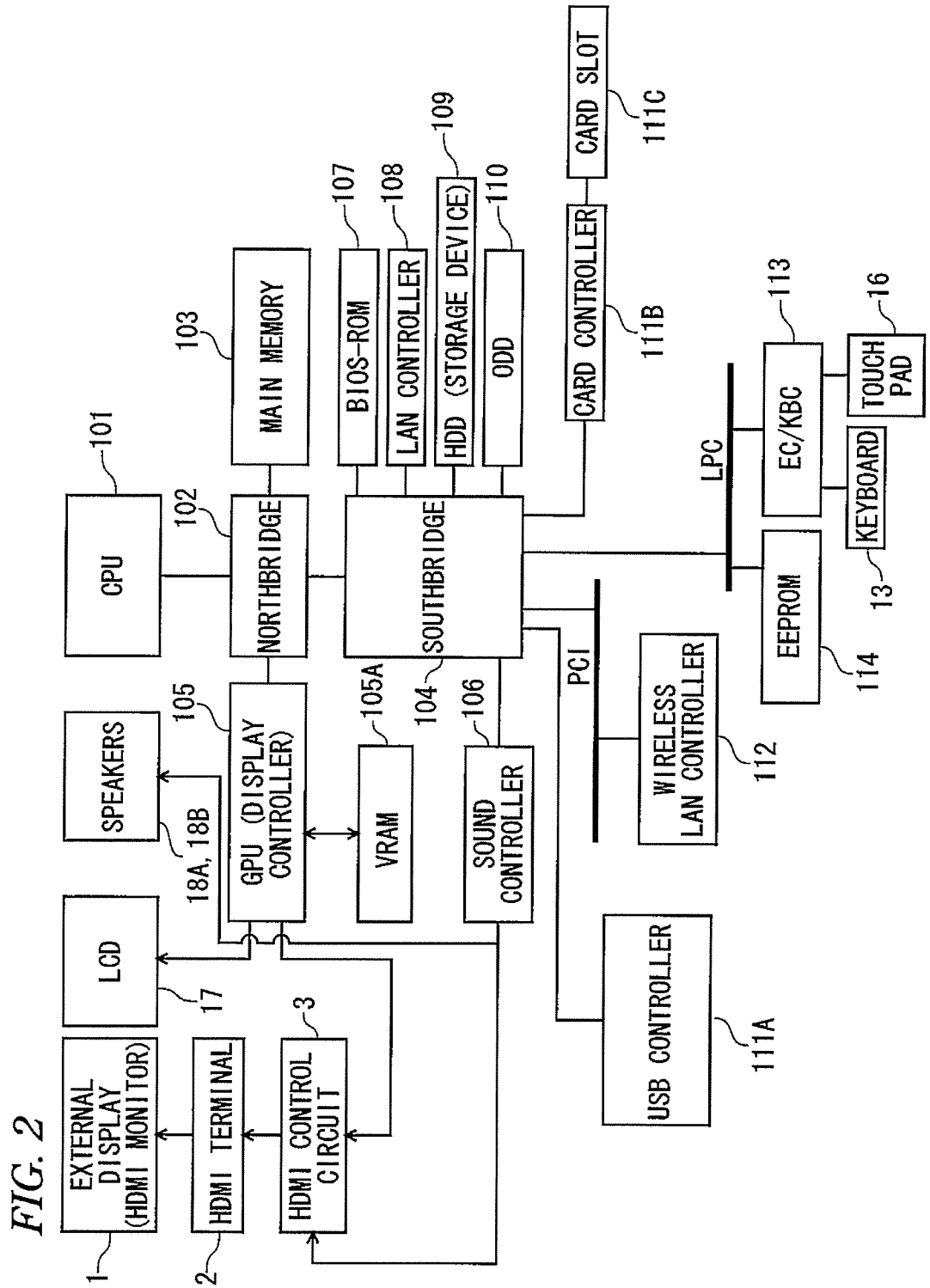
FIG. 2 is a block diagram showing an example configuration of the notebook PC according to the embodiment.

FIG. 2 is a block diagram showing the configuration of the notebook PC 10 according to the embodiment. As shown in FIG. 2, the notebook PC 10 is equipped with a CPU (central processing unit) 101, a northbridge 102, a main memory 103, a southbridge 104, a GPU (graphics processing unit) 105, a VRAM (video random access memory) 105A, a sound controller 106, a BIOS-ROM (basic input/output system-read only memory) 107, a LAN (local area network) controller 108, a hard disk drive (HDD; storage device) 109, an optical disc drive (ODD) 110, a USB controller 111A, a card controller 111B, a wireless LAN controller 112, an embedded controller/keyboard controller (EC/KBC) 113, an EEPROM (electrically erasable programmable ROM) 114, etc.

The CPU 101 is a processor which controls operations of individual components of the notebook PC 10. The CPU 101 runs a BIOS which is stored in the BIOS-ROM 107. The BIOS is programs for hardware control.

The northbridge 102 is a bridge device which connects a local bus of the CPU 101 to the southbridge 104. The northbridge 102 incorporates a memory controller for access-controlling the main memory 103. The northbridge 102 also has a function of performing a communication with the GPU 105 via, for example, a serial bus that complies with the PCI Express standard.

The GPU 105 is a display controller which controls the LCD 17 which is used as a display monitor of the notebook PC 10. A display signal generated by the GPU 105 is sent to the LCD 17. The GPU 105 can also send a digital video signal to an external display 1 via an HDMI control circuit 3 and an HDMI terminal 2.

The HDMI terminal 2 is the above-mentioned external display connection terminal. The HDMI terminal 2 can send a non-compressed digital video signal and digital audio signal to the external display 1 such as a TV receiver via a single cable. The HDMI control circuit 3 is an interface for sending a digital video signal to the external display 1 (called an HDMI monitor) via the HDMI terminal 2.

The southbridge 104 controls the individual devices on a PCI (peripheral component interconnect) bus and the individual devices on an LPC (low pin count) bus. The southbridge 104 incorporates an IDE (integrated drive electronics) controller for controlling the HDD 109 and the ODD 110.

The southbridge 104 also has a function of performing a communication with the sound controller 106.

The sound controller 106, which is a sound source device, outputs reproduction subject audio data to the speakers 18A and 18B or the HDMI control circuit 3. The LAN controller 108 is a wired communication device which performs a wired communication according to the IEEE 802.3 standard, for example. On the other hand, the wireless LAN controller 112 is a wireless communication device which performs a wireless communication according to the IEEE 802.11g standard, for example. The USB controller 111A performs a communication with an external device which complies with the USB 2.0 standard, for example.

For example, the USB controller 111A is used for receiving an image data file from a digital camera. The card controller 111B writes and reads data to and from a memory card such as an SD card that is inserted in a card slot that is formed in the computer main body 11.

The EC/KBC 113 is a one-chip microcomputer in which an embedded controller for power management and a keyboard controller for controlling the keyboard 13 and the touch pad 16 are integrated together. The EC/KBC 113 has a function of powering on or off the notebook PC 10 in response to a user manipulation of the power button 14.

In the embodiment, display control is performed in, for example, such a manner that the CPU 101 runs a program that is stored in the main memory 103, the HDD 109, or the like.

In the embodiment, as described later, information relating to a video playback speed is input to the notebook PC 10 when, for example, the user has made a corresponding manipulation on the keyboard 13 or the touch pad 16. The information relating to the video playback speed received by the notebook PC 10 is supplied to the CPU 101.

The CPU 101 receives the information relating to the video playback speed and performs 3D depth estimation processing on video according to that information. The CPU 101 outputs a resulting video signal to the LCD 17 of the video display unit 12. The LCD 17 of the video display unit 12 receives the video signal and displays video.

Figure 3:
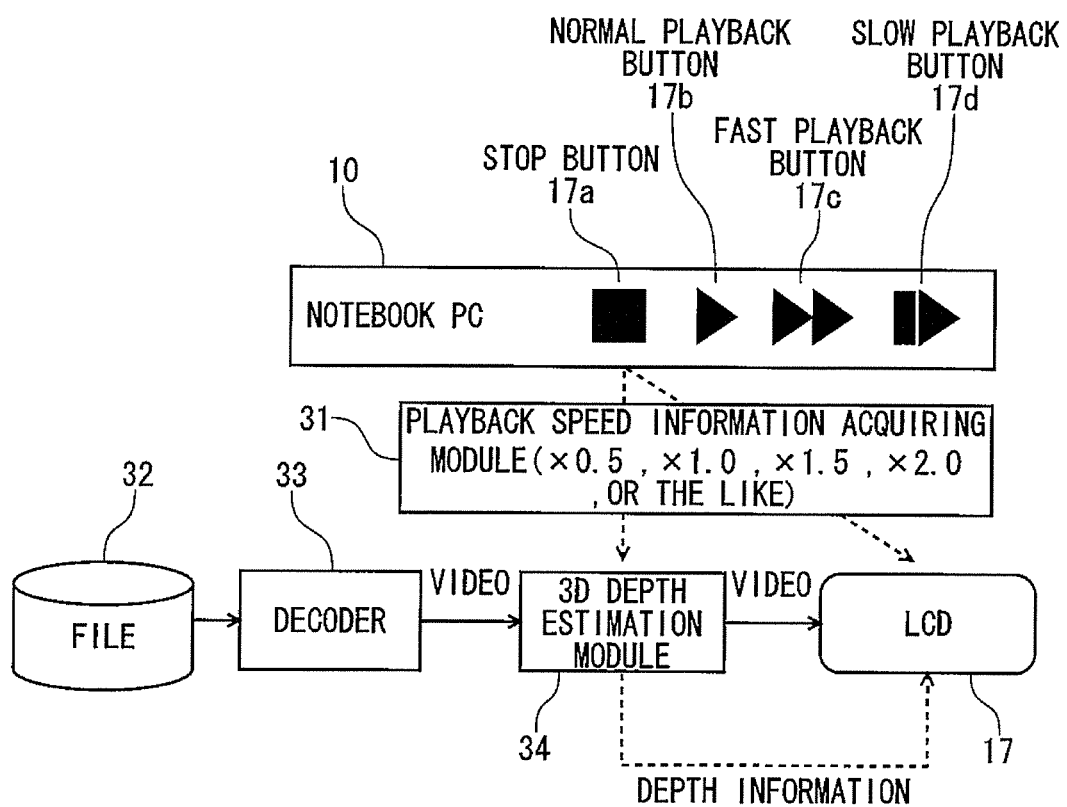
FIG. 3 is a block diagram illustrating functions of the notebook PC 10 according to the embodiment.

FIG. 3 is a block diagram illustrating functions of the notebook PC 10 according to the embodiment. As shown in FIG. 3, buttons relating to the video playback speed, that is, a stop button 17a, a normal playback button 17b, a fast playback button 17c, and a slow playback 17d, are displayed on the video display unit 12 (LCD 17) of the notebook PC 10.

As mentioned above, information relating to a video playback speed is input to the notebook PC 10 when, for example, the user has made a corresponding manipulation on the keyboard 13 or the touch pad 16.

In the embodiment, video (a content) is stored in such a storage medium such as the HDD 109, a disc inserted in the ODD 110, or a memory card inserted in the card slot 111C.

For example, if the normal playback button 17b is manipulated, the video (content) stored in the storage medium is played back at a normal speed (1 time (1.0×) speed).

If the fast playback button 17c is manipulated once, the video stored in the storage medium is subjected to first kind of fast playback (e.g., fast playback with a sound (fast viewing and listening)) whose playback speed is 1.5 times the normal speed.

If the fast playback button 17c is manipulated twice successively, the video stored in the storage medium is subjected to second kind of fast playback whose playback speed is higher than the playback speed of the first kind of fast playback (fast viewing and listening), that is, two times the normal speed. In the second kind of fast playback, a sound may be either output or not output.

If the slow playback button 17d is manipulated, the video stored in the storage medium is subjected to slow playback whose playback speed is lower than the normal speed, that is, 0.5 times the normal speed.

The information relating to the video playback speed that has been input by the user is acquired by a playback speed information acquiring module 31 and supplied to the CPU 101.

The CPU 101 receives the information relating to the video playback speed and performs 3D depth estimation processing according to that information.

The video (content) is stored in the storage medium in the form of a file 32, for example, and supplied to a decoder 33 according to an instruction from the CPU 101. The decoder 33 receives the video, decoding it, and supplies resulting video to a 3D depth estimation module 34.

The 3D depth estimation module 34 performs 3D depth estimation processing on the video according to the information relating to the video playback speed received from the CPU 101, and outputs a resulting video signal to the video display unit 12 (LCD 17 (display device)). The video signal contains 3D video depth information that corresponds to the information relating to the video playback speed.

The video display unit 12 receives the video signal and displays video according to an instruction from the CPU 101.

Example 3D depth estimation processing according to the embodiment will be described below. However, in the embodiment, the 3D depth estimation processing is not limited to the processing described below.

One example technique of generating 3D video from 2D video is 2D-3D conversion. In the 2D-3D conversion, 3D video having a sense of three-dimensionality is generated by estimating depth by applying plural techniques to 2D video. For example, this technique is implemented by employing a high-performance CPU and performing plural kinds of depth generation processing simultaneously.

For example, such techniques as motion detection and face detection are used as the above-mentioned plural techniques. For example, attention is paid to the fact that portions of a scene of a TV broadcast are classified into a "portion having motion," a "portion including a person," and a "typical compositional scene." 3D depth estimation processing is performed by applying optimum depth estimation techniques to the respective categories and combining their processing results. 3D video having a sense of three-dimensionality is thus generated.

As for the "portion having motion," a positional relationship between objects in the front-rear direction is estimated on the principle that apparent motion of an object becomes faster as it comes closer to the viewer's side and an object that moves a longer distance on a 2D screen is located closer to the viewer's side.

As for the "portion including a person," depth of a person is estimated by detecting a position of the face of the person in 2D video and applying the detected face position to a template which is statistical data of relative positions of the face, shoulder, etc.

As for the "typical compositional scene," a composition is estimated and applied by using comparison of color distributions of display image portions of the sky, a sea, or land in a natural scene.

Another example technique is to perform 3D depth estimation processing based on the degree of blurring of a subject in video.

FIG. 4 shows example methods of 3D depth estimation processing that are set in the notebook PC 10 according to the embodiment so as to correspond to the respective playback speeds. For example, settings of these processing methods are stored in the main memory 103 (see FIG. 2) in advance. As described later with reference to FIG. 7, the settings of these processing methods can be changed by, for example, a user manipulation.

In FIG. 4, reference numeral 40 denotes a processing table of example methods of 3D depth estimation processing (corresponding to the respective playback speeds) that are stored in the main memory 103. A processing level, subject pictures, the number of processing techniques, and specific 3D depth estimation processing techniques are set in advance for each playback speed to be input by the user, for example.

For example, if the slow playback (0.5×) button 17d is manipulated by the user, 3D depth estimation processing is performed by a method 41 stored and set in the main memory 103. In the method 41, the processing level is set at "1" (detailed), the subject pictures are all or almost all of the pictures, the number of processing techniques is "3," and the specific 3D depth estimation processing techniques are recognition of composition, face detection, and motion detection of all or almost all of the pictures.

If the normal playback (1.0×) button 17b is manipulated, 3D depth estimation processing is performed by a method 42 stored and set in the main memory 103. In the method 42, the processing level is set at "2" (normal), the subject pictures are approximately half of the pictures, the number of processing techniques is "3," and the specific 3D depth estimation processing techniques are recognition of composition, face detection, and motion detection of approximately half of the pictures.

If the fast playback button 17c is manipulated once for the first mode of fast playback (fast viewing and listening; 1.5×), 3D depth estimation processing is performed by a method 43 stored and set in the main memory 103. In the method 43, the processing level is set at "3" (simplified), the subject pictures are reduced images of approximately half of the pictures, the number of processing techniques is "2," and the specific 3D depth estimation processing techniques are recognition of composition and motion detection from reduced images of approximately half of the pictures.

If the fast playback button 17c is manipulated twice successively for the second mode of fast playback (2.0×), 3D depth estimation processing is performed by a method 44 stored and set in the main memory 103. In the method 44, the processing level is set at "4" (further simplified), the subject pictures are reduced images of I pictures, the number of processing techniques is "1," and the specific 3D depth estimation processing technique is recognition of composition from reduced images of I pictures.

That is, in the embodiment, if the acquired video playback speed is lower than the playback speed (e.g., 1× speed) of the normal playback, 3D depth estimation processing is performed in a more detailed manner than in the normal playback.

In other words, if the acquired video playback speed is lower than the playback speed of the normal playback, 3D depth estimation processing is performed that is larger in the amount of processing than in the normal playback.

On the other hand, if the acquired video playback speed is higher than the playback speed of the normal playback, 3D depth estimation processing is performed which is simpler than in the normal playback.

In other words, if the acquired video playback speed is higher than the playback speed of the normal playback, 3D depth estimation processing is performed that is smaller in the amount of processing than in the normal playback.

In the embodiment, the 3D depth estimation processing is controlled by the CPU 101, for example.

Figure 5:
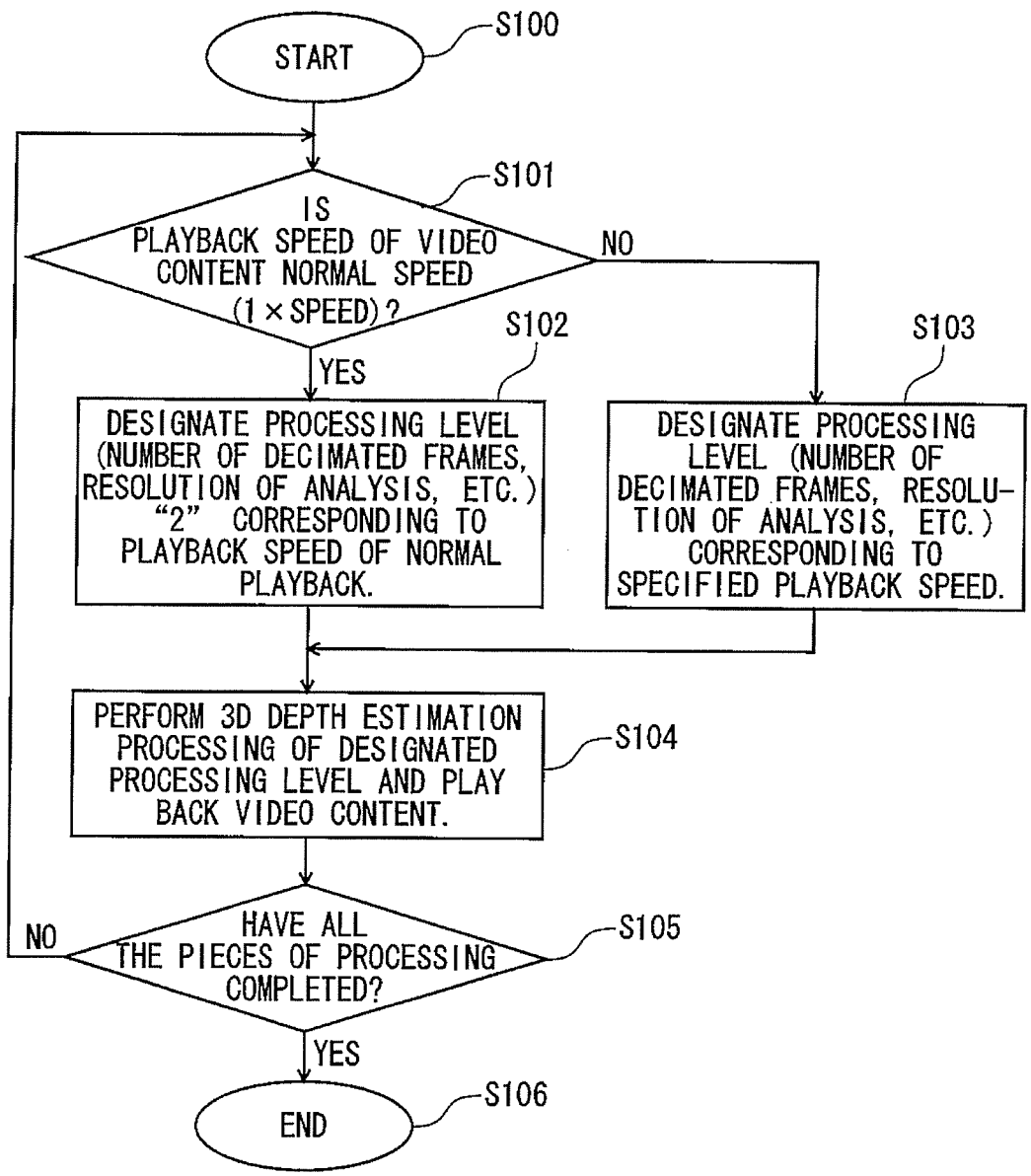
FIG. 5 is a flowchart of a process which is performed by the notebook PC according to the embodiment.

FIG. 5 is a flowchart of a process which is performed by the notebook PC 10 according to the embodiment.

The process starts at step S100. The processing proceeds to step S101. At step S101, it is determined whether the playback speed of a video content is the normal speed (1× speed) or not. If it is determined that the playback speed is the normal speed (S101: yes), the process moves to step S102. If not (S101: no), the process moves to step S103.

At step S102, the processing level (the number of decimated frames, a resolution of analysis, etc.) "2" (see FIG. 4) corresponding to the normal playback speed of the normal playback commanded by the user is designated. The processing proceeds to step S104.

At step S103, a processing level (the number of decimated frames, a resolution of analysis, etc.) (see FIG. 4) corresponding to a received playback speed is designated by the CPU 101. The processing proceeds to step S104.

At step S104, 3D depth estimation processing of the designated processing level is performed and the video content is played back. The processing proceeds to step S105.

At step S105, it is determined whether all the pieces of processing have completed or not. If it is determined that all the pieces of processing have completed (S105: yes), the process is finished at step S106. If not (S105: no), the process returns to step S101.

The process is finished at step S106.

FIG. 6 is a flowchart of a detailed process which is performed by the notebook PC 10 according to the embodiment.

The process starts at step S200. The processing proceeds to step S201. At step S201, it is determined whether playback of a video content has been commanded or not. If it is determined that playback of a video content has been commanded (S201: yes), the process moves to step S202. If not (S201: no), step S201 is performed again.

At step S202, playback speed information of the reproduction-commanded video content is acquired. The processing proceeds to step S203.

At step S203, it is determined whether the acquired playback speed information indicates the normal playback or not. Although in the embodiment the normal playback speed is the 1× speed, it may be a speed that is close to the 1× speed such as a speed within the range of a 0.9× speed to a 1.1× speed. If the acquired playback speed information indicates the normal playback (S203: yes), the process moves to step S204. If not (S203: no), the process moves to step S205.

At step S204, 3D depth estimation processing of the second level (normal; see FIG. 4) is performed on, for example, approximately half (a second number) of all (a first number) of the pictures used for the playback of the video content. The processing proceeds to step S211.

At step S205, it is determined whether the acquired playback speed information indicates the slow playback (0.5× speed (or a speed that is lower than the normal speed)) or not. If it is determined that the acquired playback speed information indicates the slow playback (S205: yes), the process moves to step S206. If not (S205: no), the process moves to step S207.

At step S206, 3D depth estimation processing of the first level (detailed; more detailed than of the second level (normal)) is performed on, for example, all the pictures (first number) used for the playback of the video content. As shown in FIG. 4, the 3D depth estimation processing of the first level (detailed) is larger than that of the second level (normal) in the amount of processing. The processing proceeds to step S211.

At step S207, it is determined whether the acquired playback speed information indicates the first mode of fast playback (1.5× speed (or a speed that is higher than the normal speed)) or not. If it is determined that the acquired playback speed information indicates the first mode of fast playback (S207: yes), the process moves to step S208. If not (S207: no), the process moves to step S209.

At step S208, 3D depth estimation processing of the third level (simplified; simpler than of the second level (normal)) is performed on reduced images of, for example, approximately half (a third number) of all (first number) of the pictures used for the playback of the video content. The processing proceeds to step S211.

At step S209, it is determined whether the acquired playback speed information indicates the second mode of fast playback (2.0× speed (or a speed that is higher than the speed of the first mode of fast playback)) or not. If it is determined that the acquired playback speed information indicates the second mode of fast playback (S209: yes), the process moves to step S210. If not (S209: no), the process returns to step S201.

At step S210, 3D depth estimation processing of the fourth level (further simplified; simpler than of the third level (simplified)) is performed on reduced images of, for example, I pictures (a fourth number) of the video content. As shown in FIG. 4, the 3D depth estimation processing of the fourth level (further simplified) is smaller than that of the third level (simplified) in the amount of processing. The processing proceeds to step S211.

The video content complies with the standard that was established by the MPEG (Moving Picture Experts Group) and is composed of GOPs (groups of pictures). Each GOP may include three kinds of pictures, that is, I, P, and B pictures, and each GOP includes at least one I picture.

At step S211, the video content is played by using estimated depth values. The processing proceeds to step S212.

At step S212, it is determined whether all the pieces of processing for the playback of the video content have completed or not. If it is determined that all the pieces of processing have completed (S212: yes), the process is finished at step S213. If not (S212: no), the process returns to step S201.

The process is finished at step S213.

FIG. 7 shows an example setting screen which allows the user to set or change 3D depth estimation processing methods corresponding to the respective playback speeds in the notebook PC 10 according to the embodiment.

This 3D depth estimation processing setting screen is displayed on the video display unit 12.

FIG. 7 shows initial settings, which are stored in, for example, the main memory 103 (see FIG. 2) in advance like the 3D depth estimation processing methods. As described above, the preset initial settings areas follows. The first level (detailed; denoted by numeral 71 in FIG. 7) is set for the slow playback (0.5×), the second level (normal; denoted by numeral 72) is set for the normal playback (1.0×), the third level (simplified; denoted by numeral 73) is set for the first mode of fast playback (1.5×), and the fourth level (further simplified; denoted by numeral 74) is set for the second mode of fast playback (2.0×).

When the user has changed a setting, resulting data is stored in the main memory 103.

For example, the user changes the processing level of the normal playback (1.0×) to the first level (detailed) or changes the processing level of the second mode of fast playback (2.0×) to the third level (simplified) while looking at the 3D depth estimation processing setting screen.

As described above, the processing levels of 3D depth estimation processing methods corresponding to the respective playback speeds are set or changed by a user manipulation and stored in the main memory 103.

Although the embodiment is directed to 3D video that is obtained by converting 2D video by 2D-3D conversion, the embodiment is not limited to such a case and can also be applied to playback of, for example, 3D video that is stored in a storage medium.

In the embodiment having the above configuration, for example, when the user wants to view a certain scene of a video content carefully by a slow playback, the load (the amount of processing) of the 3D depth estimation processing is varied so as to be suitable for the slow reproduction speed.

For example, in a slow playback, the number of frames that are subjected to 3D depth estimation processing is increased or the estimation resolution is kept high.

This makes it possible to provide an electronic apparatus which is superior in followability to a scene change of a video content, is low in the probability of occurrence of an error in 3D depth estimation processing (e.g., composition analysis), and can display attractive, high-image-quality 3D video.

In the embodiment, if, for example, the user commands fast playback or fast playback with a sound, it is determined that the user would not be particular about the image quality unlike in the case of slow playback. Thus, for example, the number of frames that are subjected to 3D depth estimation processing is reduced or part of the plural 3D depth estimation processing techniques are omitted.

This makes it possible to increase the response speeds of other applications used in the notebook PC 10 and to increase the power saving performance.

With the above configuration, the embodiment of the invention can provide a 3D video output apparatus (electronic apparatus) which can display more attractive 3D video in playing back a video content.

All of the control process according to the embodiment can be performed by software. Therefore, the advantages of the embodiment can be obtained easily by installing a program of the control process in an ordinary computer through a computer-readable storage medium stored with it and running it.

The invention is not limited to the above embodiment itself and, in the practice stage, may be embodied in such a manner that constituent elements are modified in various manners without departing from the spirit and scope of the invention.

And various inventive concepts may be conceived by properly combining plural constituent elements disclosed in the embodiment. For example, several ones of the constituent elements of the embodiment may be omitted.

Further, constituent elements according to different embodiments may be properly combined.

What is claimed is:

1. An electronic apparatus comprising:
 a playback speed information acquiring module that acquires information relating to a playback speed of a 2D video;
 a setting module that determines whether each of a plurality of 3D depth estimation processing routines is to be activated according to the information relating to the playback speed of the 2D video and activates at least one of the plurality of 3D depth estimation processing routines based on the determination;
 an estimation module that estimates a depth of a 3D video relating to the 2D video by applying the 3D depth estimation processing routine activated by the setting module; and
 a video signal output module that converts a video signal corresponding to the 2D video to a video signal corresponding to the 3D video based on the estimated depth and outputs the video signal corresponding to the 3D video.

2. The electronic apparatus of claim 1, wherein the video signal output module performs 3D depth estimation processing that is more detailed than in normal playback when the playback speed indicated by the acquired information is lower than a normal playback speed in the normal playback.

3. The electronic apparatus of claim 1, wherein the video signal output module performs 3D depth estimation processing that is simpler than in normal playback when the playback speed indicated by the acquired information is higher than a normal playback speed in the normal playback.

4. The electronic apparatus of claim 1, wherein the playback speed of the video comprises a first speed for normal playback at a normal speed, a second speed for slower playback which is slower than the first speed, and a third speed for faster playback which is faster than the first playback.

5. The electronic apparatus of claim 1, wherein the video is subjected to 2D-3D conversion processing.

6. The electronic apparatus of claim 1, wherein the video is stored in a video storage module, and the video stored in the video storage unit is played back.

7. The electronic apparatus of claim 1, wherein the video signal output module performs 3D depth estimation processing that is larger in processing amount than in normal playback when the playback speed indicated by the acquired information is lower than a normal playback speed in the normal playback.

8. The electronic apparatus of claim 1, wherein the video signal output module performs 3D depth estimation processing that is smaller in processing amount than in normal playback when the playback speed indicated by the acquired information is higher than a normal playback speed in the normal playback.

9. The electronic apparatus of claim 1, wherein the 3D depth estimation processing is set in advance in a storage module.

10. The electronic apparatus of claim 1, further comprising a video display module that receives the output video signal and displays video.

11. The electronic apparatus of claim 10, wherein the video display module displays a screen which allows setting of the 3D depth estimation processing.

12. A control method of an electronic apparatus, the method comprising:
 acquiring information relating to a playback speed of a 2D video;
 determining whether each of a plurality of 3D depth estimation processing routines is to be activated according to the information relating to the playback speed of the 2D video and activating at least one of the plurality of 3D depth estimation processing routines based on the determination;
 estimating a depth of a 3D video relating to the 2D video by applying the activated 3D depth estimation processing routine; and
 converting a video signal corresponding to the 2D video to a video signal corresponding to the 3D video based on the estimated depth, and outputting the video signal corresponding to the 3D video.

13. A non-transitory computer-readable storage medium that stores a program for causing a computer to execute procedures comprising:
 acquiring information relating to a playback speed of a 2D video;
 determining whether each of a plurality of 3D depth estimation processing routines is to be activated according to the information relating to the playback speed of the 2D video and activating at least one of the plurality of 3D depth estimation processing routines based on the determination;
 estimating a depth of a 3D video relating to the 2D video by applying the activated 3D depth estimation processing routine; and
 converting a video signal corresponding to the 2D video to a video signal corresponding to the 3D video based on the estimated depth, and outputting the video signal corresponding to the 3D video.

* * * * *